(12) United States Patent
Wang et al.

(10) Patent No.: US 8,176,496 B2
(45) Date of Patent: May 8, 2012

(54) PARTIAL ORDER REDUCTION USING GUARDED INDEPENDENCE RELATIONS

(75) Inventors: Chao Wang, Plainsboro, NJ (US);
Zijian Yang, Northville, MI (US);
Vineet Kahlon, Princeton, NJ (US);
Aarti Gupta, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 952 days.

(21) Appl. No.: 12/181,665

(22) Filed: Jul. 29, 2008

(65) Prior Publication Data

US 2009/0089783 A1    Apr. 2, 2009

Related U.S. Application Data

(60) Provisional application No. 60/976,871, filed on Oct. 2, 2007.

(51) Int. Cl.
*G06F 9/44*    (2006.01)
*G06F 9/46*    (2006.01)
*G06F 9/50*    (2006.01)

(52) U.S. Cl. ....................... 718/106; 717/127
(58) Field of Classification Search ............... 718/106; 717/127
See application file for complete search history.

(56) References Cited

U.S. PATENT DOCUMENTS

| 6,385,765 | B1* | 5/2002 | Cleaveland et al. | 717/100 |
| 2006/0248515 | A1* | 11/2006 | Qadeer et al. | 717/127 |
| 2007/0168988 | A1* | 7/2007 | Eisner et al. | 717/126 |

OTHER PUBLICATIONS

Online Proceedings from SPIN 2007 14$^{th}$ International SPIN Workshop on Model Checking Software, Berlin, Germany Jul. 1-3, 2007.*
Preface and Table of Content of Lecture Notes in Computer Science, vol. 4591, Springer, for Model Checking Software, 14$^{th}$ International SPIN Workshop, Berlin, Germany, Jul. 1-3, 2007.*
Vineet Kahlon et al.; Symbolic Model Checking of Concurrent Programs Using Partial Orders and On-the-Fly Transactions; CAV 2006; LNCS 4144; 2006; pp. 286-299.
Flanagan et al.; Dynamic Partial-Order Reduction for Model Checking Software; POPL '05; Jan. 12-15, Long Beach, CA; 2005; 12 pages.
Gueta et al.; Cartesian Partial-Order Reduction; International SPIN Workshop on Model Checking Software; pp. 95-112; Springer 2007; LNCS 4595.

* cited by examiner

*Primary Examiner* — Daniel Pan
(74) *Attorney, Agent, or Firm* — Joseph Kolodka; James Bitetto (57) ABSTRACT

A system and method for conducting symbolic partial order reduction for concurrent systems includes determining a guarded independence relation which includes transitions from different threads that are independent for a set of states, when a condition or predicate holds. Partial order reduction is performed using the guarded independence relation to permit automatic pruning of redundant thread interleavings when the guarded independence condition holds.

16 Claims, 6 Drawing Sheets

$T_1$ i = foo() ;
  ...
A a[i] = 10 ;
B a[i] = a[i]+20;
C *p = a[j] ;

$T_2$ j = bar() ;
  ...
$\alpha$ a[j] = 50 ;
$\beta$ a[j] = a[j]+100;
$\gamma$ *q = a[i] ;

$$X = trans \setminus \{t_1, t_2\}$$

PARTIAL ORDER REDUCTION USING GUARDED INDEPENDENCE RELATIONS

RELATED APPLICATION INFORMATION

This application claims priority to provisional application Ser. No. 60/976,871 filed on Oct. 2, 2007, incorporated herein by reference.

BACKGROUND

1. Technical Field

The present invention relates to concurrent system verification and more particularly to systems and methods for program verification using peephole partial order reduction with guarded independence relations.

2. Description of the Related Art

Verifying multi-threaded programs is a difficult problem due to the potentially large number of interleavings of transitions from different threads. In explicit-state model checking, partial order reduction (POR) techniques have been used to exploit the equivalence of interleavings of independent transitions in order to reduce the search state space. Since deciding whether two transitions are dependent may be as hard as solving the verification problem itself, existing methods based on persistent sets (including stubborn sets) or sleep sets often need to use a static analysis to precompute dependent transitions in a conservative (hence less precise) way.

Dynamic partial order reduction lifts the need for applying static analysis a priori by computing persistent sets on-the-fly with dynamic collision detection. The method performs a stateless search and is restricted to cycle-free systems; extending it to a stateful search and combining it with symbolic methods have proven to be difficult.

A major strength of symbolic methods such as SAT-based bounded model checking (BMC) is that, property dependent search space reduction is automatically exploited inside the Boolean or propositional satisfiability (SAT) or Satisfiability Modulo Theories (SMT) solver through the addition of conflict clauses and non-chronological backtracking. In practice, symbolic methods are more efficient than explicit-state methods in handling data (e.g., variables with large domains). Explicit-state model checking does not benefit from the aforementioned reduction brought by the SAT and SMT solvers. Combining persistent-set based methods (and explicit-state reduction methods in general) with symbolic model checking is not an easy task.

The difficulty arises from the fact that explicit-state model checking inspects concrete states individually, while symbolic methods typically manipulate a large set of states implicitly. In particular, transitions that are dynamically independent with respect to a set of paths are much harder to capture and to exploit than transitions that are dynamically independent with respect to a single path.

Figure 1:
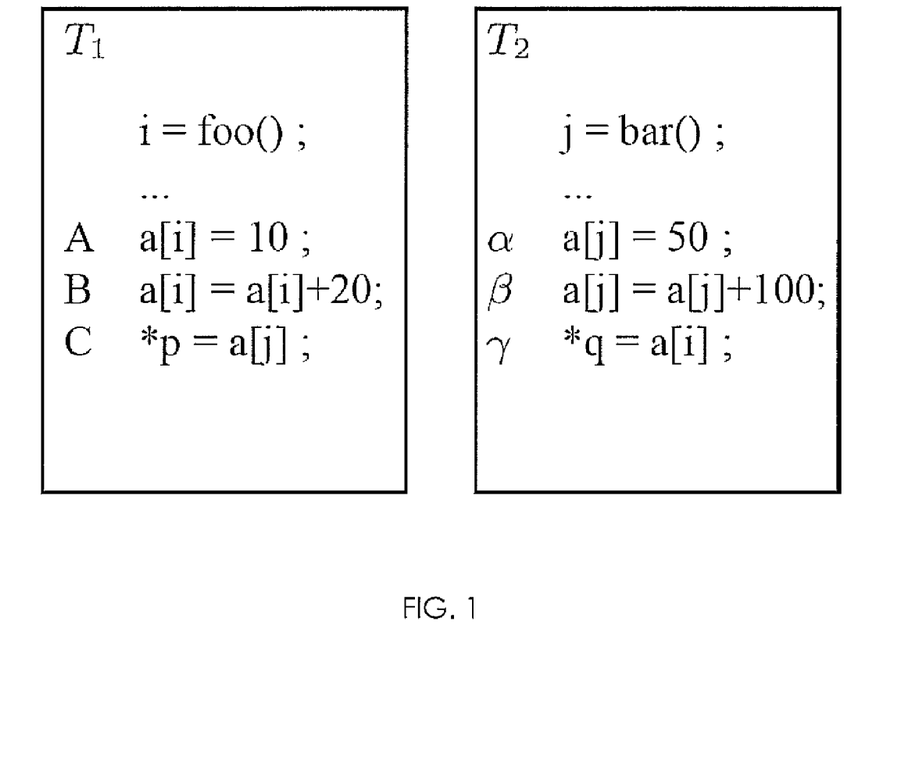
FIG. 1 is a diagram showing program code for two threads to illustrate principles described herein.

In FIG. 1, for example, two concurrently running threads access a global array $\alpha$, and the two pointers p and q may be aliased. Thread $T_1$ has three transitions $t_A t_B t_C$. Thread $T_2$ has three transitions $t_\alpha t_\beta t_\gamma$. Statically, $t_A, t_B$ may have conflicts with $t_\alpha, t_\beta$. However, if in some execution paths (i≠j) holds, then $t_A, t_B$ and $t_\alpha, t_\beta$ become independent transitions, meaning that the two execution sequences $t_A; t_B; t_\alpha; t_\beta; t_C; t_\gamma;$ and $t_\alpha; t_\beta; t_A; t_B; t_C; t_\gamma;$ are equivalent. Unfortunately, this information cannot be captured by existing symbolic partial order reduction methods. For example, the conventional methods can detect and exploit the above equivalent interleavings if i=foo( ) and j=bar( ) are replaced by i=1 and j=2, but not in the general case.

In explicit-state model checking, traditional partial order reduction methods that rely on a conservative static analysis are unlikely to exploit such conditional equivalence. Dynamic partial order reduction remedies this by detecting conflicts on-the-fly. At each concrete state inside the adaptive search, the value of i and j (as well as p and q) are fully determined, making it much easier to detect conflicts (with respect to a particular path). However, it is not easy to directly combine this technique (based on the notion of happens-before) with symbolic encoding.

Figure 2:
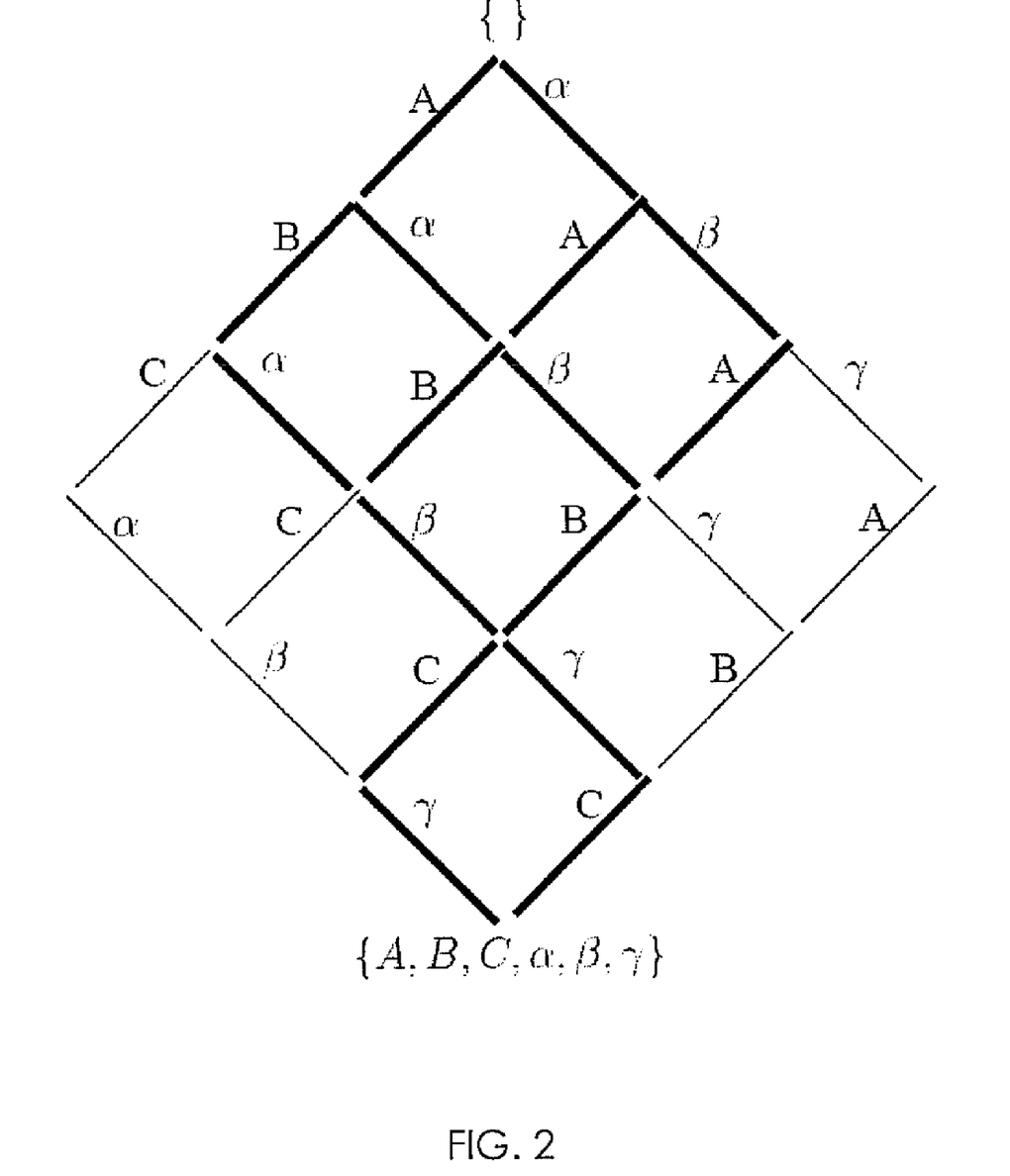
FIG. 2 is a lattice diagram showing interleaving of the program of FIG. 1.

For symbolic algorithms, missing out on these kinds of dynamic partial-order reductions can be costly, since the model checker needs to exhaustively search the reduced set executions. Suppose a multi-threaded program P has n threads where each thread executes at most k steps. Then the total number of executions of P may be as large as $(nk)!/(k!)^n >= (n!)^k$. For the running example, we can capture all the possible interleavings using the lattice structure in FIG. 2. Let trans={$t_A; t_B; t_C; t_\alpha; t_\beta; t_\gamma;$} be the set of transitions in the two threads. Each vertex of the lattice represents a distinct subset of trans, consisting of the transitions that are already executed. The set of vertices forms a powerset $2^Q$; the top vertex is { } and the bottom vertex is {$t_A; t_B; t_C; t_\alpha; t_\beta; t_\gamma;$}. A path from top to bottom denotes a unique interleaving. For example, the left-most line corresponds to $t_A; t_B; t_C; t_\alpha; t_\beta; t_\gamma;$.

In concurrent systems, the number of interleaving of transitions from different threads or processes can be very large. Existing partial order reduction methods for pruning redundant interleaving during verification are not accurate enough and not suited for symbolic implementation.

SUMMARY

A system and method for conducting symbolic partial order reduction for concurrent systems includes determining a guarded independence relation which includes transitions from different threads that are independent for a set of states, when a condition or predicate holds. Partial order reduction is performed using the guarded independence relation to permit automatic pruning of redundant thread interleavings when the guarded independence condition holds.

A system and method for conducting symbolic partial order reduction for concurrent systems includes determining an independence relation between transitions of different threads, and performing partial order reduction using a peephole encoding that imposes constraints on a finite window of transitions at a state based on the independence relation to permit automatic pruning of redundant thread interleavings.

A system and method for conducting symbolic partial order reduction for concurrent systems includes determining a guarded independence relation which includes independent transitions that for which a guarded independence condition holds. Partial order reduction is performed using a peephole satisfiability (SAT) encoding to facilitate partial order reduction inside a SAT/Satisfiability Modulo Theory (SMT) solver by permitting automatic pruning of redundant interleavings inside the SMT solver, when the guarded independence condition is satisfied.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, a new notion of "guarded independence relation (GIR)" is provided to accurately capture dynamic independent transitions in a concise way. The present embodiments will be referred to as a "peephole partial order reduction" or PPOR, which is a method to encode the GIR as a set of constraints. For systems with two threads, the GIR/PPOR method guarantees removal of any redundant interleaving. There is no such guarantee by any existing method in the prior art.

The combination of GIR and PPOR is well suited for symbolic implementation using SMT/SAT solvers—traditional POR methods (based on persistent sets) are not well suited for symbolic implementation.

A new symbolic encoding scheme and an SMT solver are provided to capture and exploit the dynamic independence of transitions. For the guarded independence relation (GIR), $R_G$ is introduced, where each $(t_1, t_2, c_G) \in R_G$ corresponds to a guarded independent pair of transitions $t_1, t_2$ when a guard constraint $c_G$ holds. This is an extension of the classic definitions of (conditional) independence relation, which are defined with respect to either a single state or all states. The guard $c_G$ is a predicate referring to local and global data state (values) and not just local control state. Based on the guarded independence relation, a peephole reduction is provided to concisely capture the dynamically independent transitions as constraints to restrict the satisfiability formula in bounded model checking. In the peephole partial order reduction, adding GIR constraints needs identification of a pattern in a fixed sized time window only (e.g., size 2), and therefore eases the burden of having to detect collisions in the future. The added GIR constraints allow the SMT solver to prune the search state space automatically. Faster verification runtime (and the capability of verifying larger systems) is provided. Experiments show that GIR/PPOR can significantly reduce the verification runtime.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Figure 3:
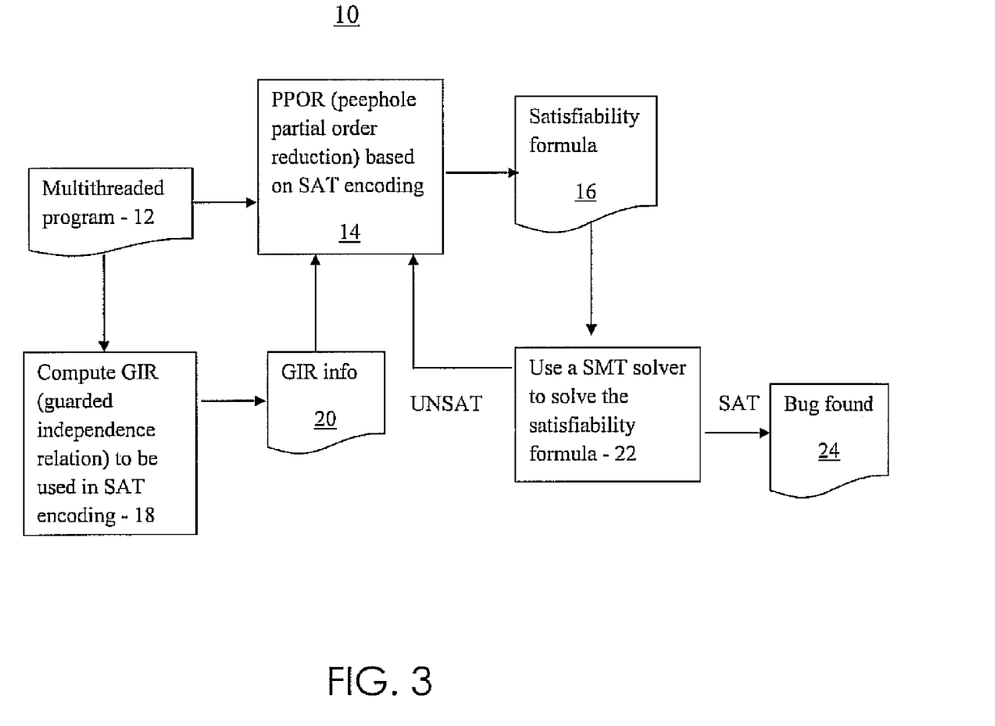
FIG. 3 is a block/flow diagram showing a system/method for verifying a multithreaded program in accordance with one illustrative embodiment.

Referring now to the drawings in which like numerals represent the same or similar elements and initially to FIG. 3, a block/flow diagram showing a system/method 10 for program verification flow in accordance with one illustrative embodiment. A multithreaded program is provided in block 10. The multithreaded program needs to be verified to determine whether conflicts between threads exist. A multithreaded program may have an extremely large number of feasible thread executions, each of which needs to be inspected to fully verify the program. The multithreaded program is input to block 18 to compute guarded independence relation (GIR) information 20 for the multithreaded program 12. In block 18, the method for computing GIR info is employed for symbolic partial order reduction based SAT encoding. The set of all guarded independent transition pairs, together with the condition under which the two transitions are independent, are gathered by a traversal of the program control flow graph.

Guarded independent transitions, i.e., transitions that can be considered as independent in certain (but not all) execution paths, can be captured by using a new symbolic encoding scheme. The new encoding scheme adds concise constraints to permit automatic pruning of redundant interleavings inside a SMT/SAT solver, when a partial variable assignment (i.e., variables that have been assigned concrete values by the SMT/SAT solvers up to this point) makes some guarded independence conditions evaluate to true.

Based on the GIR information 20 and the multithreaded program 12, peephole partial order reduction (PPOR) encoding is performed in block 14. Partial order reduction (POR) is a method for pruning away redundant thread executions in verification. With POR, only the non-redundant thread executions need to be inspected as opposed to all thread executions. PPOR in accordance with the present principles guarantees reduction optimality for programs with 2 threads, that is, all redundant thread executions will be removed. Existing methods cannot guarantee this. PPOR is well suited for SAT-based symbolic encoding. PPOR is more efficient than methods in the prior art, and results is SAT formulae which are much smaller in size.

The output of block 14 is a satisfiability (SMT/SAT) formula 16, to be given to block 22 for solving. Block 22 employs a solver, e.g., an SMT solver to solve the satisfiability formula 16. If block 22 determines that formula 16 is satisfiable, then a bug 24 is found. If the formula 16 is unsatisfiable in block 22, then the program goes back to block 14 to produce another formula. The process repeats until all bugs are found and the formula is unsatisfiable.

Definition 1: The relation $R \subset trans \times trans$ is an independence relation iff for all $(t_1, t_2) \in \overline{R}$ the following two properties hold for all global state $s \in S$. if $t_1$ is enabled in s and $$s \xrightarrow{t_1} s',$$

then $t_2$ is enabled in s iff $t_2$ is enabled in s'; and if $t_1$ and $t_2$ are enabled in s, then there is a unique state s' such that $$S \xrightarrow{t_1 t_2} S' \text{ and } S \xrightarrow{t_2 t_1} S'.$$

In other words, independent transitions can neither disable nor enable each other, and enabled independent transitions commute. The definition has been mainly of semantic use, since it is not practical to check the above two properties for all states in order to determine which transitions are independent.

In persistent set based methods, for each state, one computes a subset of the enabled transitions, called the persistent set, and in the adaptive search one only explores transitions in the persistent set. A transition is put into the persistent set if it has read-write or write-write conflicts with the (potentially infinite) future of another thread. Since precisely deciding whether two transitions are dependent may be as hard as solving the underlying verification problem, traditionally collision detection uses static analysis, where the inherent approximations often lead to a coarser persistent set. For instance, some statically easy-to-check sufficient conditions, have been used in practice to replace the above conditions: 1) the set of threads that are active for $t_1$ is disjoint from the set of threads that are active for $t_2$, or 2) the set of objects that are accessed by $t_1$ is disjoint from the set of objects that are accessed by $t_1$.

Such conditions may miss some independent transitions, like $t_1:\alpha[i]=e_1$ and $t_2:\alpha[i]=e_2$ when i≠j as it is not clear a priori if a[i] and a[j] refer to the same array element. In a conditional dependence relation, two transitions are defined as independent with respect to a single state s ∈ S as opposed to for all s ∈ S. Such extension is geared towards explicit-state model checking, in which persistent sets can be computed for each global state s ∈ S. There are existing methods that exploit the conditional dependence relation, e.g., conditional stubborn set and the more recent dynamic partial order reduction. However, both of them are explicit-state methods—it is not clear how to directly apply these techniques to symbolic model checking. The dynamic partial order reduction method only performs a stateless search and is restricted to cycle-free systems. Furthermore, even if all independent transitions are statically identified, persistent set based methods may still miss reduction.

In contrast, the present method, which is based on the new notion of the guarded independence relation, often offers significantly more reduction. In the special case where there are only two threads in the system, the present method guarantees to remove all redundant interleavings.

Guarded Independence Relation: Definition 2: Two transitions $t_1$, $t_2$ are guarded independent with respect to the condition $c_G$ (a predicate over local and global variables), i.e., $\langle t_1,t_2,c_G\rangle \in R_G$, iff whenever $c_G$ holds, the following properties hold for all s ∈ S: 1) if $t_1$ is enabled in s and $$S \xrightarrow{t_1} S,$$

then $t_2$ is enabled in s iff $t_2$ is enabled in s'; and 2) if $t_1$ and $t_2$ are enabled in s, then there is a unique state s' such that $$S \xrightarrow{t_1 t_2} S' \text{ and } S \xrightarrow{t_2 t_1} S'.$$

The two properties for the guarded independence relation are an extension of the conditional dependence relation, where the tuple ($t_1$, $t_2$, s) is defined with respect to a single state s ∈ S, restricting its use to explicit state space exploration. In the present case, the independence is valid for all states in which $c_G$ holds, i.e., it is with respect to a (potentially large) set of states.

Unlike previous explicit partial order reduction techniques that approximate the properties in Definition 1 due to expensive computational cost, we are able to apply the properties in Definition 2 precisely using an SMT/SAT solver. Due to the capability of SMT/SAT solvers to reason about values implicitly, such guarded independence relation can be captured as additional constraints to the satisfiability formulae. These constraints facilitate automatic state space pruning inside the SMT/SAT solver. The guarded independence condition $c_G$ can be easily derived from the structure of the program.

For a transition t, we use $v_{RD}(t)$ to denote the set of variables read by t, and $v_{RW}(t)$ to denote the set of variables written by t. We define the potential conflict set between $t_1$ and $t_2$ to be $C_{t1,t2}=V_{RD}(t_1)\cap V_{WR}(t_2) \cup V_{RD}(t_2)\cap V_{WR}(t_1) \cup V_{WR}(t_1)\cup V_{WR}(t_2)$.

In the running example (FIG. 1), $C_{t_it_u}=\{\alpha[i], \alpha[j]\}$. We now list the different scenarios under which we compute the guarded independence tuples:

1) when $C_{t1,t2}=0$, put $\langle t_1,t_2,\text{true}\rangle$ into $R_G$;
2) when $C_{t1,t2}=\{a[i], \alpha[j]\}$, where a[i], $\alpha$[j] are array accesses, put $\langle t_1, t_2, i\neq j\rangle$ into $R_G$;
3) when $C_{t1,t2}=\{*p_i,*p_j\}$, where $p_i$, $p_j$ are pointers that may be aliased, put $\langle t_1, t_2, p_i\neq p_j\rangle$ into $R_G$;
4) when $C_{t1,t2}=\{x\}$, consider the following cases:
  a) RD-WR: if $x \in V_{RD}(t_1)$ and the assignment x:=e appears in $t_2$, put $\langle t_1,t_2, x=e\rangle$ into $R_G$;
  b) WR-WR: if x:=$e_1$ appears in $t_1$ and x:=$e_2$ appears in $t_2$, put $\langle t_1, t_2, e_1=e_2\rangle$ into $R_G$;
  c) WR-C: if x appears in the guard cond in $t_1$, such as while(cond), and x:=e appears in $t_2$, put $\langle t1, t2, \text{cond}=\text{cond}[x\rightarrow e]\rangle$ into $R_G$, in which cond[x→e] denotes the replacement of x with e.

Pattern 4(a) states that two read/write operations to the same variable are guarded independent if the write does not change the value of the variable. Pattern 4(b) states that two write operations to the same variable are guarded independent if their newly assigned values are the same. In these cases, $c_G$ evaluates to true frequently, because many of these shared variables have small ranges, especially when they are used for control purposes. If b is a Boolean variable, then b:=$e_1$ and b:=$e_2$ may have a 50% chance of being guarded independent. Pattern 4(c) is a special case of 4(a): it is true that x=e implies cond=cond[x→e]; however, there are cases when x≠e but cond=cond [x→e]. Let if(x<10) be a transition in thread 1 and x:=e be in thread 2, they are guarded independent as long as (x<10)=(e<10), even if the value of x is different after the assignment.

Multiple patterns can appear in the same pair of transitions. In such cases, the overall condition is a conjunction or disjunction of individual conditions. For example, if $t_1$:if(a[i]>5) and $t_1$: $\alpha$[j]:=x, $c_G$ is defined as i≠j∨($\alpha$[i]>5)=(x>5).

Bounded Model Checking (BMC): The bounded model checking as presented herein is preferably SAT based. A symbolic partial order reduction is presented for concisely encoding GIRs to reduce search space.

Given a multi-threaded program and a reachability property, we check the property on all execution paths of the program up to a fixed depth K. For each step $0 \leq k \leq K$, we build a formula $\Psi$ such that $\Psi$ is satisfiable iff there exists a length-k interleaving execution that violates the property. For a given unrolling depth k, the BMC instance is $\Psi = \Phi \wedge \Phi_{prop}$, in which $\Psi$ represents all the possible interleavings of the program up to k steps and $\Phi_{prop}$ is the constraint indicating that the given property is violated. The property needs to be encoded into a formula $\Phi_{prop}$. In the following, we focus on the formulation of $\Psi$.

Let V be the set of state variables; $V = V_{global} \cup \bigcup V_i$, where $V_{global}$ includes the global state variables and $V_i$ includes the state variables local to thread $T_i$. For every program variable, we assign a state variable to either $V_i$ or $V_{global}$. Array and pointer accesses need special handling. For an array access a[i], we assign a state variable for the index i and another state variable for the content a[i]. Similarly, for a pointer access *p, we assign separate state variables for (*p) and p. We add a $pc_i$ variable for each thread $T_i$ to represent its current program location. To model the nondeterministic scheduler, we add a variable sel whose domain is $\{1, 2, \ldots, N\}$ for N threads. Transitions in thread $T_i$ are executed only when sel=i.

To represent all the possible length-k interleavings, we need to encode the transition relations of individual threads and the scheduler, and unfold the composed system exactly k time frames. For this purpose, at every time frame we add fresh copies of the state variables. Let $v^i \in V^i$ denote the copy of $v \in V$ at the i-th time frame.

$$\Phi := I(V^0) \wedge \bigwedge_{i=0}^{k} \left( SCH(V^i) \wedge \bigwedge_{j=1}^{N} TR_j(V^i, V^{i+1}) \right),$$

where $I(V^0)$ represents the set of initial states, SCH represents the transition relation of the scheduler, and $TR_j$ represents the transition of thread $T_j$. We now consider the formulation for SCH and $TR_j$.

Threads: We assume that there is a preprocessing phase in which the original program (e.g., written in a C-like language) is simplified into a program with only simple assignments and branching statements. Similar assumptions have been made in other verification tools like SLAM, BLAST, and F-Soft, which are known in the art. Let $VS_j = V_{global} \cup V_j$ be the set of variables visible to thread $T_j$. At the i-th time frame, for every transition $t \in trans_j$, which is from control location $loc_1$ to $loc_2$, we create a constraint $tr_t^i$ as follows:

1. If t is an assignment v:=e, then $tr_t^i$:

$pc_j^i = loc_1 \wedge pc_j^{i+1} = loc_2 \wedge v^{i+1} = e^i \wedge (VS_j^{i+1} \setminus v^{i+1}) = (VS_j^i \setminus v^i).$ 2. If t is a condition c, as in if(c) or while(c), then $tr_t^i$:=

$pc_j^i = loc_1 \wedge c^i \wedge pc_j^{i+1} = loc_2 \wedge VS_j^{i+1} = VS_j^i.$ The entire transition relation $TR_t^i$ is defined as follows:

$$TR_j^i := \left( sel^i = j \wedge \bigvee_{t \in trans_j} tr_t^i \right) \vee (sel^i \neq j \wedge V_j^{i+1} = V_j^i),$$

where the second term indicates that if thread $T_j$ is not selected for execution, the local variables in $V_j$ do not change their value (other variables are not constrained).

Scheduler: We represent the transition relation of scheduler as follows: SCH (V):=(sel=*). Without any additional constraint, SCH=true, which means that sel takes arbitrary values at every step. This default SCH considers all the possible interleavings. Partial order reduction can be implemented by adding constraints to SCH to remove redundant interleavings.

Figure 4:
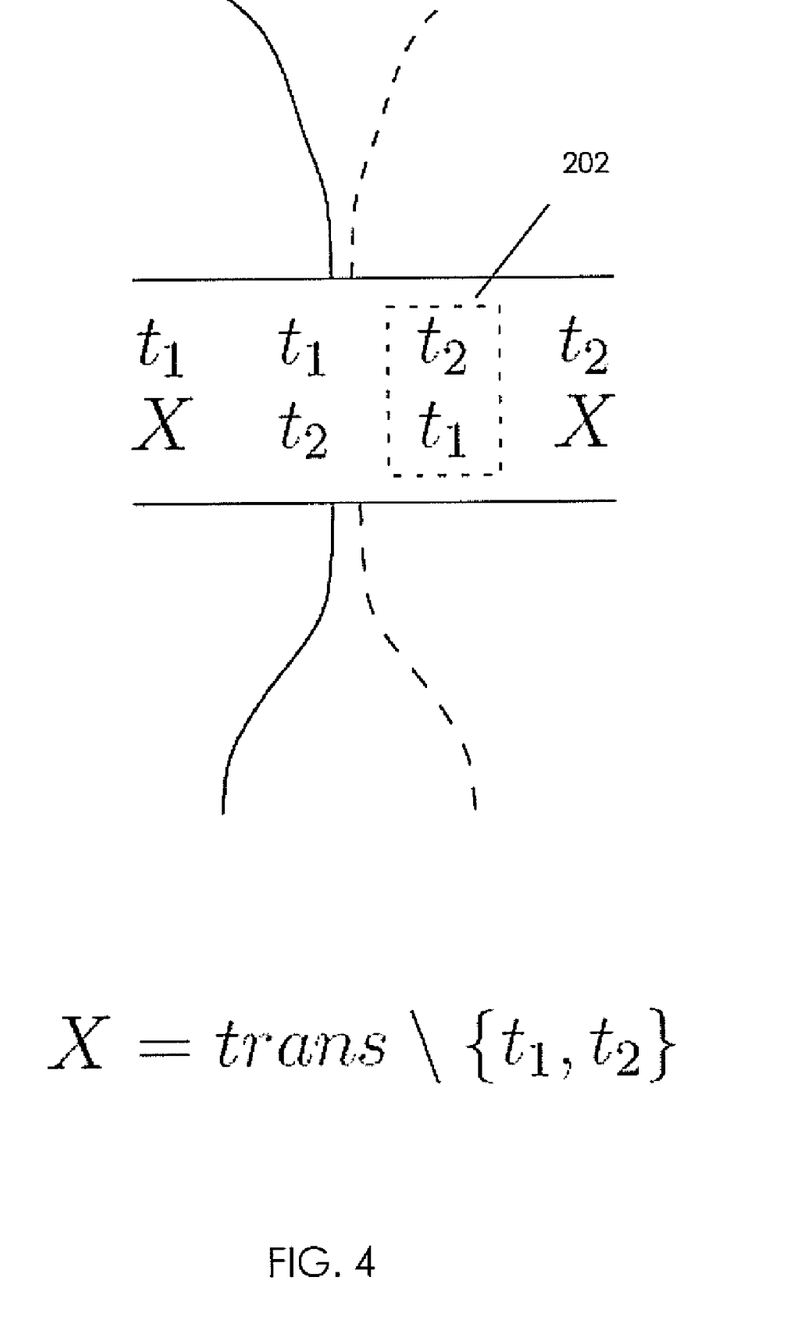
FIGS. 4 and 5 are diagrams depicting the removal of redundant interleavings in accordance with the present principles.

Peephole Partial Order Reduction: We want to capture the fact that if two length-k execution sequences are in the same equivalence class, only one of them needs to be checked for property violation. To achieve such partial-order reduction, for each pair of guarded independent transitions, we add some constraints to SCH to restrict the scheduler. For a tuple $\langle t_1, t_2, x=e \rangle \in R_G$ where $t_1 \in trans_i$ and $t_2 \in trans_j (i<j)$, we conjoin the following constraint to SCH, $enable_{t_1}(V^k) \wedge enable_{t_2}(V^k) \wedge c_G(V^k) \rightarrow \neg (sel^k = j \wedge sel^{k+1} = i),$ where $enable_{t_1}(V^k)$ and $enable_{t_2}(V^k)$ are the conditions under which $t_1$ and $t_2$ are enabled at the k-th time frame. Note that if transitions $t_1$ and $t_2$ are independent and both are enabled, we will explore the schedule starting from $t_1$, and also the schedule starting from $t_2$. However, the above constraint enforces a fixed order on the priority of scheduling two independent transitions $t_1$, $t_2$. Since the following two equivalent sequences $\ldots ; t_1, t_2; \ldots$ and $\ldots ; t_2, t_1; \ldots$ are equivalent, we always prefer the sequence in which two independent transitions are scheduled in their thread index order, i.e., $t_1$ ahead of $t_2$ if $i<j$. We forbid the second sequence by adding the constraint $\neg(sel^k = j \wedge sel^{k+1} = i)$, as is illustrated in FIG. 4, which shows the removal of only redundant interleavings. Interleaving 202 is redundant and removed.

Figure 5:
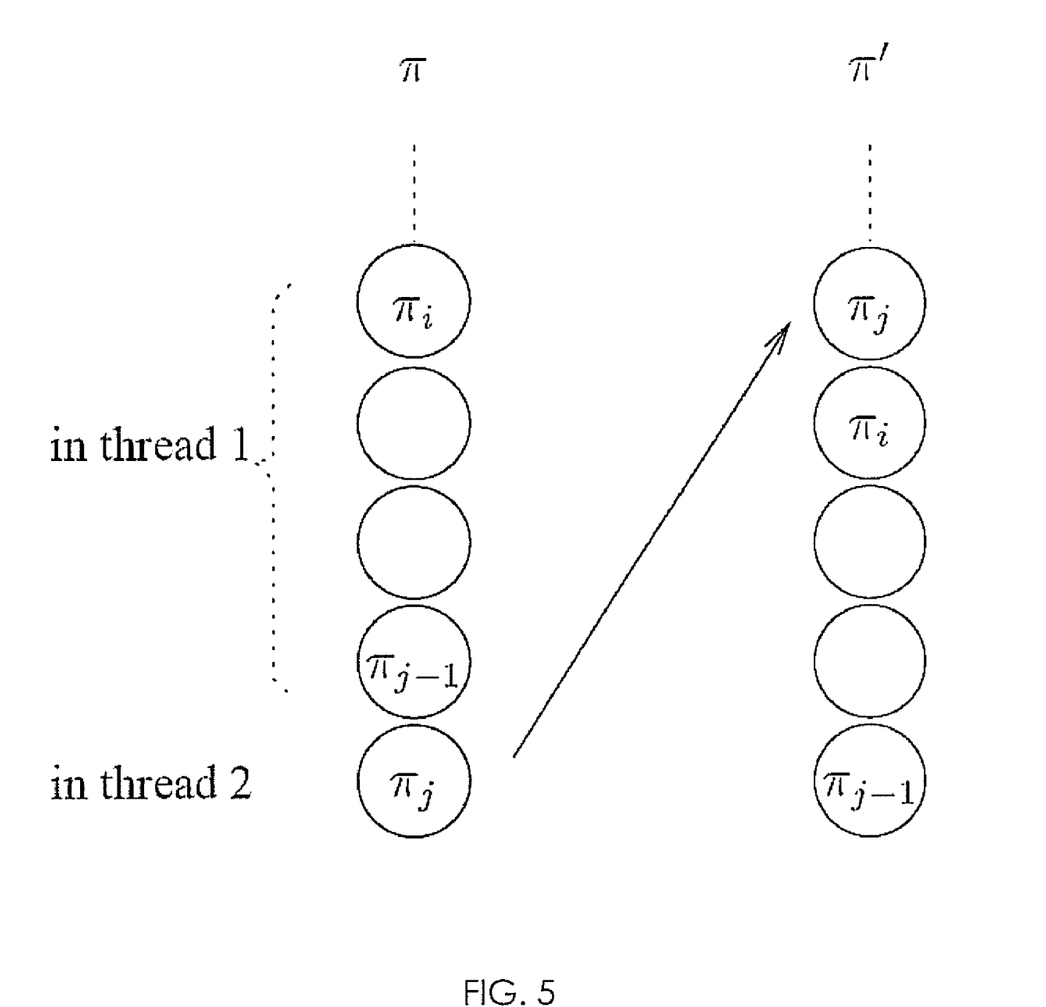

In the running example (FIG. 1), at the k-th time frame ($0 \leq k \leq K$), $SCH^k = [pc_1^k = A \wedge pc_2^k = \alpha \wedge (i^k \neq j^k) \rightarrow \neg (sel^k = 2 \wedge sel^{k+1} = 1)] \wedge$ $[pc_1^k = A \wedge pc_2^k = \beta \wedge (i^k \neq j^k) \rightarrow \neg (sel^k = 2 \wedge sel^{k+1} = 1)] \wedge$ $[pc_1^k = B \wedge pc_2^k = \alpha \wedge (i^k \neq j^k) \rightarrow \neg (sel^k = 2 \wedge sel^{k+1} = 1)] \wedge$ $[pc_1^k = B \wedge pc_2^k = \beta \wedge (i^k \neq j^k) \rightarrow \neg (sel^k = 2 \wedge sel^{k+1} = 1)] \wedge$ $[pc_1^k = C \wedge pc_2^k = \gamma \wedge$ $(i^k \neq j^k \wedge p^k \neq q^k) \rightarrow \neg (sel^k = 2 \wedge sel^{k+1} = 1)]$ When $i \neq j$ all the sequences starting with $t_\alpha; t_A; \ldots$ are removed. However, the added constraint does $\overline{not remove}$ the sequences starting with $t_\alpha; t_\beta; t_A; \ldots$. SCH initially includes all the possible interleavings of threads. For every interleaving $\pi'$ removed by adding GIR constraints, there always remains an equivalent interleaving $\pi$. All interleavings removed by peephole reduction (PPOR) are redundant, and for two threads, the peephole reduction removes all the redundant inter-leavings from SCH as depicted in FIG. 5. For more than two threads, the peephole reduction does not always guarantee the removal of all redundant interleavings.

For example, let transitions $t_A t_\alpha t_x$ belong to threads $T_1$, $T_2$, $T_3$, respectively. Assume that $t_A$ and $t_x$ are dependent, but, $t_\alpha$ is guarded independent with both $t_A$ and $t_x$ Then the following two interleavings are equivalent, $\underline{t_x; t_A; t_\alpha; \ldots}$ $t_\alpha; t_x; t_A; \ldots$ However, both interleavings are allowed by the peephole reduction utilizing the GIR constraints, since the segment $t_A; t_\alpha;$ obeys thread($t_A$)<thread($t_\alpha$) and the segment $t_\alpha; t_x;$ obeys thread($t_\alpha$)<thread($t_x$). One can group the three transitions into two independent sets: $\{t_A, t_x\}$ and $\{t_\alpha\}$. The nonoptimality arises from the fact that there does not exist an order of the two sets in which the pair-wise independent transitions are ordered in a way consistent with the ordered thread indices.

Extending the peephole reduction to guarantee the removal of all redundant interleavings in the more general cases is possible, but the simple peephole reduction over a window of size two is preferred to gain the best results with the lowest overhead. Even for more than two threads, the present reduction is able to remove significantly more redundant interleavings than existing symbolic methods.

Reducing the Overhead of GIR Constraints: For an encoding scheme, in the worst case one needs to add $\pi_{i=1}'[T_1]$, constraints to SCH, where $[T_1]$ represents the number of transitions in thread $T_i$. These constraints need to be replicated at each time frame, which may pose a significant performance overhead for the SMT solver. An optimization technique is presented that can significantly reduce the overhead.

Merging Constraints: When $c_G$ holds, if the transition $t_1 \in trans_i$ is independent with respect to all transitions $t_2 \in trans_j$ in another thread, then we do not need to add GIR constraints separately for all $\langle t_1, t_2 \rangle$ pairs. Instead, we merge all these GIR constraints and simplify it into $enable_{t1}(V^k) \rightarrow \neg(sel^k=j \wedge sel^{k+1}=i)$.

A simple case in which this optimization can be applied is when $t_1$ is a local transition (invisible to other threads). In this case, the effect captured is similar to that obtained from detecting transactions. We note that the effectiveness of our reduction is best observed when interleavings occur at transactional boundaries. Peephole reduction is orthogonal and complementary to transaction based reduction methods. However, the above rule is not restricted only to such simple cases. As a more complicated case, consider N dining philosophers in which all transitions in one thread are visible (at least to one philosopher other than itself). For two philosophers (i and j) that are not adjacent to each other, a transition $t_1 \in trans_i$ (in the i-th philosopher) is always independent with all transitions in $trans_j$.

Dependent Transitions: For loosely coupled threads, the number of independent transition pairs may be significantly larger than the number of dependent transition pairs (conflicts). In such cases, we can use an alternative encoding scheme to reduce the overhead of GIR constraints. Instead of adding a constraint for every independent transition pair, we choose to focus on the fewer dependent transition pairs.

Figure 6:
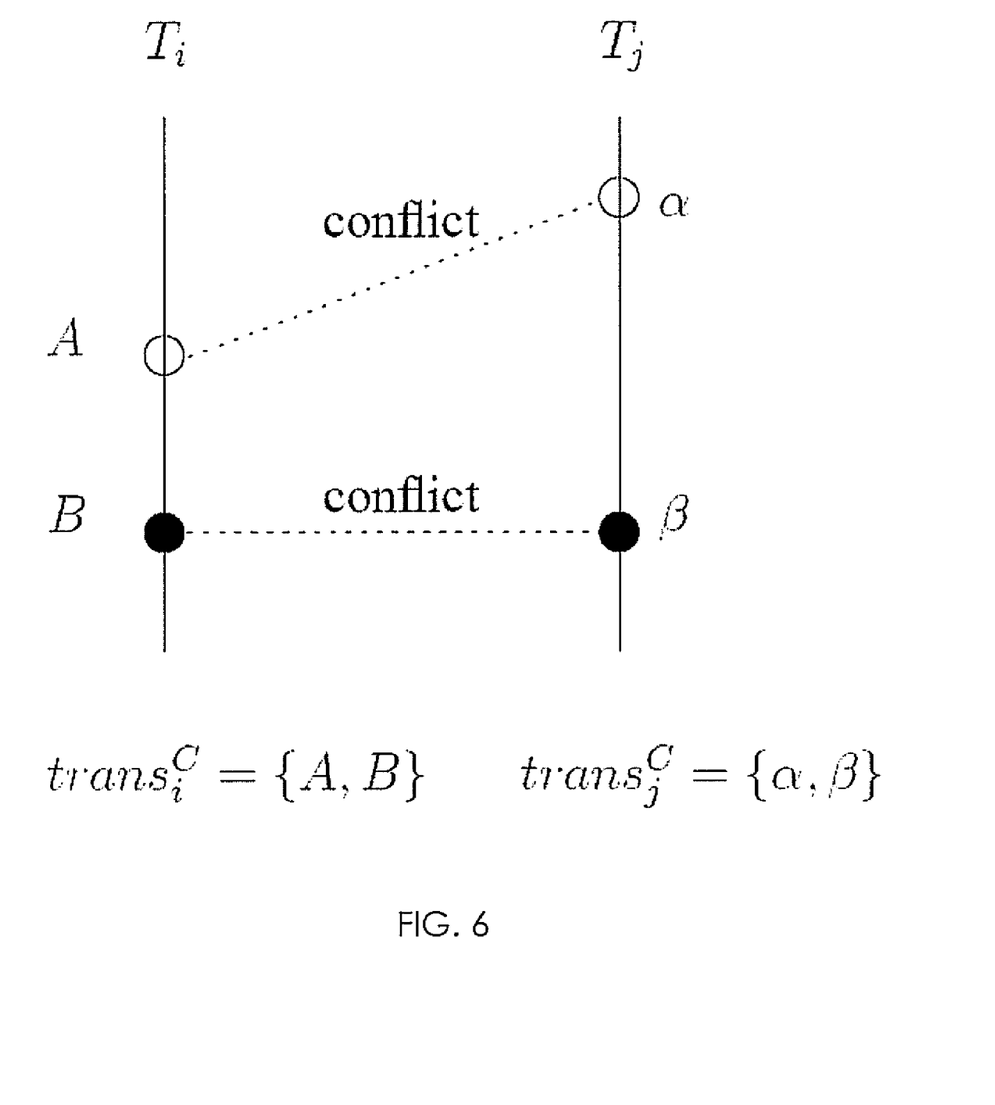
FIG. 6 is a diagram depicting the use of dependent transition to optimize encoding in accordance with the present principles.

For every pair of threads $T_i$ and $T_j$ (i<j), let $trans_i^C \subset trans_i$ and $trans_j^C \subset trans_j$ denote the two subsets of transitions that may be dependent with the other thread. By definition, $\forall t_1 \in (trans_i \backslash trans_i^C)$ and $\forall t_2 \in (trans_j \backslash trans_j^C)$, $t_1$ and $t_2$ are always independent. This is illustrated in FIG. 6. Some transitions in $trans_i^C$ and $trans_j^C$ may still be independent from each other.

First, we define $en_{Ti}$ for thread $T_i$ as follows, $$en_{T_i} := \bigvee_{\forall t \in (trans_i \backslash trans_i^C)} enable_i.$$

Then, we summarize constraints for all these always-independent transition pairs. For each i and j, we add $enable_{T_i}(V^k) \wedge enable_{T_j}(V^k) \rightarrow \neg(sel^k=j \wedge sel^{k+1}=i)$. Then, for each $t_1 \in trans_i^C$ and $t_2 \in trans_j^C$ if $\langle t_1, t_2, c_G \rangle \in R_G$, we add $pc_i^k = src(t_1) \wedge pc_j^k = src(t_2) \wedge c_G(V^k) \rightarrow \neg(sel^k=j \wedge sel^{k+1}=i)$. This optimization is suited for cases in which $|trans_i^C|$ and $|trans_j^C|$ are significantly smaller than $|trans_i|$ and $|trans_j|$. As an example, if two threads are completely independent, then only one constraint needs to be added to SCH.

We have presented a new peephole partial order reduction method for model checking concurrent systems, based on a new notion of a guarded independence relation. A concise symbolic encoding of locally independent pairs is provided which is well suited for using SMT/SAT solvers to find property violations. The new peephole POR method can achieve significantly more reduction compared to the existing methods. For systems with two concurrent threads, this method guarantees the removal of all redundant interleavings.

A symbolic dynamic partial order reduction (POR) method has been presented for model checking concurrent software. Guarded independent transitions, i.e., transitions that can be considered as independent in certain (but not all) execution paths, which can be captured by using a new symbolic encoding scheme have been implemented. The new encoding scheme adds concise constraints to permit automatic pruning of redundant interleavings inside a SMT/SAT solver, when certain guarded independence conditions are satisfied by a partial variable assignment. For two threads, the methods guarantee the removal of all redundant interleavings.

Having described preferred embodiments of a system and method for partial order reduction using guarded independent transitions (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for conducting symbolic partial order reduction for concurrent systems of multithreaded executions, comprising:

determining a guarded independence relation which includes transitions from different threads that are independent for a set of states, when a condition or predicate holds;

performing symbolic partial order reduction in bounded model checking using the guarded independence relation to permit automatic pruning of redundant thread interleavings when the guarded independence condition holds; and representing all possible length-k interleavings by adding at every time frame copies of program state variables with $$\Phi := I(V^0) \wedge \bigwedge_{i=0}^{k} \left( SCH(V^i) \wedge \bigwedge_{j=1}^{N} TR_j(V^i, V^{i+1}) \right),$$

where $v^i \in V^i$ denotes a copy of $v \in V$ at the i-th time frame and $I(v^0)$ represents a set of initial states, SCH represents a transition relation of a scheduler, and $TR_j$; represents the transition of thread $T_j$.

2. The method as recited in claim 1, wherein determining a guarded independence relation includes statically computing a potential conflict set between all pairs of thread transitions.

3. The method as recited in claim 1, further comprising reducing a size of representation of the guarded independence relation, by merging independent thread transition pairs with common independence conditions.

4. The method as recited in claim 1, further comprising reducing a size of representation of the guarded independence relation, by encoding dependent thread transition pairs.

5. A computer readable medium comprising a computer readable program stored in a computer-readable medium, wherein the computer readable program when executed on a computer causes the computer to perform the steps of claim 1.

6. A method for conducting symbolic partial order reduction for concurrent systems of multithreaded executions, comprising:
   determining an independence relation between transitions of different threads; and
   performing symbolic partial order reduction in bounded model checking using a peephole encoding that imposes constraints on a finite window of transitions at a state based on the independence relation to permit automatic pruning of redundant thread interleavings; and
   representing possible length-k interleavings by adding at every time frame copies of program state variables with $$\Phi := I(V^0) \wedge \bigwedge_{i=0}^{k} \left( SCH(V^i) \wedge \bigwedge_{j=1}^{N} TR_j(V^i, V^{i+1}) \right),$$

where $v^i \in V^i$ denotes a copy of $v \in V$ at the i-th time frame and $I(V^0)$ represents a set of initial states, SCH represents a transition relation of a scheduler, and $TR_j$ represents the transition of thread $T_j$.

7. The method as recited in claim 6, wherein the independence relation is a guarded independence relation.

8. The method as recited in claim 7, wherein determining the independence relation includes statically computing a potential conflict set between all pairs of thread transitions.

9. The method as recited in claim 7, further comprising reducing a size of representation of the guarded independence relation, by merging independent thread transition pairs with common independence conditions.

10. The method as recited in claim 7, further comprising reducing a size of representation of the guarded independence relation, by encoding dependent thread transition pairs.

11. The method as recited in claim 6, wherein the peephole encoding adds constraints to permit automatic pruning of redundant thread interleavings during a search performed by a Satisfiability Modulo Theory/Boolean Satisfiability (SMT/SAT) solver.

12. The method as recited in claim 11, further comprising determining transaction boundaries of a concurrent system, wherein the peephole encoding is applied only on transitions that denote context switches between threads at the transaction boundaries.

13. The method as recited in claim 11, further comprising performing symbolic partial order reduction during SMT/SAT based bounded model checking of the concurrent system to find design errors.

14. The method as recited in claim 6, wherein the peephole encoding provides constraints that guarantee optimal reduction of thread interleavings for programs with two threads.

15. The method as recited in claim 6, further comprising determining transaction boundaries of a concurrent system, wherein the peephole encoding is applied only on transitions that denote context switches between threads at the transaction boundaries.

16. A computer readable medium comprising a computer readable program stored in a computer-readable medium, wherein the computer readable program when executed on a computer causes the computer to perform the steps of claim 6.

* * * * *